United States Patent [19]

Bommeli

[11] 4,404,448
[45] Sep. 13, 1983

[54] PROCESS AND APPARATUS FOR GAP CONTROL OF AN EDM APPARATUS

[75] Inventor: M. Bernard Bommeli, Dully, Switzerland

[73] Assignee: Ateliers des Charmilles S.A., Geneva, Switzerland

[21] Appl. No.: 284,774

[22] Filed: Jul. 20, 1981

[30] Foreign Application Priority Data

Jul. 30, 1980 [CH] Switzerland ............... 5802/80

[51] Int. Cl.³ .................................................. B23P 1/08
[52] U.S. Cl. ........................ 219/69 G; 219/69 M; 219/69 D
[58] Field of Search ............ 219/69 M, 69 E, 69 D, 219/69 G, 69 S, 69 C

[56] References Cited

U.S. PATENT DOCUMENTS 3,420,759 1/1969 Inoue ............................ 219/69 D
4,049,942 9/1977 Balleys et al. ............... 219/69 M

*Primary Examiner*—M. H. Paschall
*Attorney, Agent, or Firm*—Hauke and Patalidis

[57] ABSTRACT

A process and apparatus for accurately controlling the dimensions of a workpiece machined by EDM, by developing a linear function of the average value of the delay between the application of voltage pulses and the flow of electrical discharges through the gap between an electrode tool and an electrode workpiece. The function is linear and is an inverse function of the machining gap width to the logarithm of the average delay time. Two measures effected under well-determined machining conditions permit to develop the function with precision under such conditions, and it is thus possible to instantaneously know the real machining gap width by determining only the average value of the triggering delay.

4 Claims, 2 Drawing Figures

PROCESS AND APPARATUS FOR GAP CONTROL OF AN EDM APPARATUS

BACKGROUND OF THE INVENTION

The invention relates to a method and apparatus for machining by electrical discharges an electrode workpiece by means of an electrode tool, wherein a liquid fluid, having electrically conductive particles which are suspended in the liquid, is introduced in the machining zone between the electrodes, and consecutive voltage pulses are applied between the electrodes for triggering the electrical discharges. The process and apparatus of the invention permit high precision control of the width of the electrical discharge gap between the electrode workpiece and the electrode tool in an EDM apparatus.

The accuracy of machining by EDM a cavity in a workpiece by means of an electrode tool is essentially dependent upon the accuracy of the limit of feed of the electrode tool and the width of the gap at the moment at which machining is stopped. Diverse solutions have been proposed in the past for solving the problem presented by electronically controlling, with high precision, the relative position of the electrodes and for decreasing the rate of wear of the electrode tool in the course of a finishing pass. However, the gap may vary very widely according to the voltaic couple presented by the material compositions of the workpiece and of the electrode tool, the machining rate and the rate of contamination of the machining fluid. Those variable factors have all a direct influence upon the precision and accuracy of machining.

SUMMARY OF THE INVENTION

The principal object of the invention is to provide a solution to the above-mentioned problems. The solution provided by the invention is in a process wherein a liquid fluid having electrically conductive particles in suspension in the liquid is introduced into the machining zone between the electrode workpiece and the electrode tool of an EDM apparatus, and consecutive voltage pulses are applied between the electrodes for triggering machining electrical discharges, which consists in measuring the width of the gap between the electrodes and the average value of the delay for triggering electrical discharges across the gap for at least two different values of the gap, determining by means of those measurements parameters for a known empirical function which ties the gap width to the electrical discharge triggering delay average value, and utilizing the obtained function to determine an instantaneous value of the gap from an instantaneous measure of the average value of the triggering delay, the concentration of particles in suspension in the machining fluid and the surface of the electrodes subjected to electrical discharges being maintained constant in the course of the measuring.

Such a method for controlling the machining gap has particular applications for finishing operations in the course of which an artificial expansion of the electrode tool is effected by means of a cyclical translation motion of the electrode tool relative to the workpiece. In effect, under such circumstances, the frontal and lateral gaps are substantially the same and it is thus possible to effectuate a precise control of the electrode feed in every direction producing electrical discharges.

The many objects and advantages of the present invention will become apparent to those skilled in the art when the following description of the best mode contemplated for practicing the invention is read in conjunction with the accompanying drawings showing, in a schematic manner and for illustrative purpose, an example of apparatus for practicing the method of the present invention. In the drawings:

DETAILED DESCRIPTION OF THE PREFERRED EMBODIMENT

It is known that machining by electrical discharges is achieved under good conditions when the machining fluid introduced into the machining zone has a certain contamination rate, i.e. when the concentration of particles in suspension in the fluid reaches at least a predetermined rate.

The new process of the invention is particularly useful in the event that the solid particles in suspension in the machining fluid have a composition different from that of the electrodes. When the concentration of the particles in suspension in the machining fluid is maintained constant and in the event that the surface subjected to electrical discharges together with the amplitude of the voltage pulses triggering the electrical discharges are not subject to variations, there is an unequivocal relationship between the width of the electrical discharge gap and a statistical value of the average time delay for triggering the electrical discharges.

Figure 1:
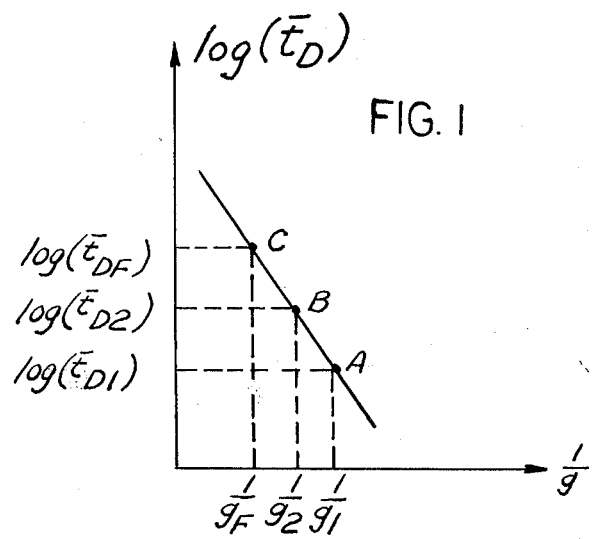
FIG. 1 is a graph illustrating the relationship, experimentally obtained, between the electrical discharge gap and the average electrical discharge triggering delay.

Such a relationship is a linear function between the inverse of the gap and the logarithm of the average value of the electrical discharge triggering delay, as graphically illustrated at FIG. 1. The linear function may be used for calculating the value of the gap on the basis of measuring the average triggering delay of the electrical discharges. If two points of the straight line representing the linear function are known, the function can be determined. If $\bar{t}_D$ represents the average triggering delay and g the width of the electrical discharge gap, the linear function is of the following form:

$$\log. \bar{t}_D = (-C1/g) + C2$$

wherein C1 is a function of the electrical discharge triggering voltage and C2 is, in addition, a function of the surface subjected to electrical discharges and of the concentration of electrically conductive particles in suspension in the machining fluid. Consequently, in order to take advantage of the linear function it is sufficient to maintain constant those three machining parameters, the electrical discharge triggering voltage, the surface areas subjected to electrical discharges and the concentration of particles.

By effecting two consecutive measures of $\bar{t}_D$ and g for two different values of g, two equations are obtained permitting to calculate the values of the two constants C1 and C2.

One manner in which the electrical discharge gap width can be varied at the end of a machining pass consists in stopping the advance of the electrode tool while continuing machining by electrical discharges. At the instant when the electrode tool is stopped, the width $g_1$ of the gap and the value $\overline{t}_{D1}$ of the electrical discharge average triggering delay are measured, which provide the point A of the straight line function of FIG. 1. Subsequently, in the course of the widening of the gap, the values $g_2$ and $\overline{t}_{D2}$ are measured, which provide the point B. If the final machining dimension is obtained by a width $g_F$ of the gap, machining is stopped by shutting off the pulse generator of the EDM apparatus, when the average triggering delay reaches the value $\overline{t}_{DF}$ corresponding to the point C of the linear function.

Figure 2:
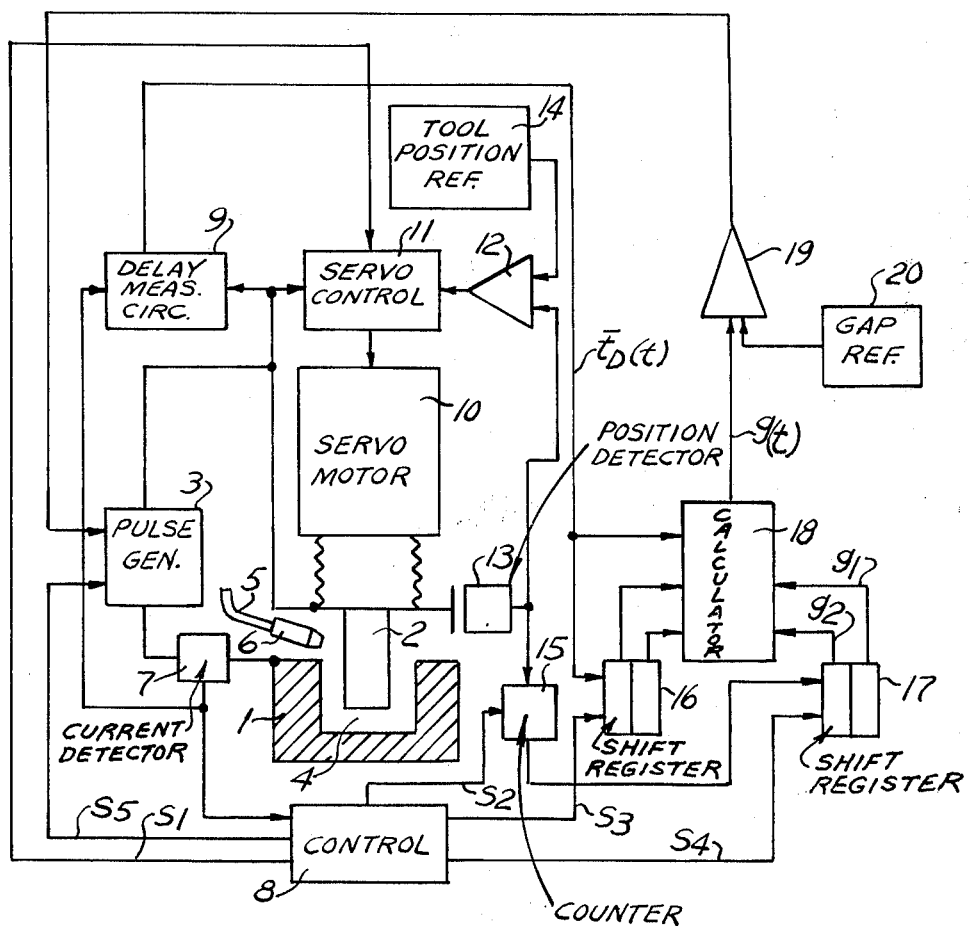
FIG. 2 is a schematic block diagram of an EDM apparatus provided with a gap control system according to the present invention.

The measuring operations are effected by means of the circuit schematically illustrated in block diagram form at FIG. 2. An electrode workpiece 1 is machined by way of an electrode tool 2. A pulse generator 3 is connected between the electrodes such as to provide consecutive voltage pulses triggering electrical discharges across a machining gap 4 between the electrodes. A machining fluid having electrically conductive solid particles in suspension in the liquid is introduced into the machining zone in the gap 4 by a conduit 5 provided with a nozzle 6. A current detecting element 7 is connected between one of the terminals of the pulse generator 3 and the workpiece 1 for providing a signal which is applied to a control circuit 8 and to one of the inputs of a circuit 9 measuring the average triggering delay of the electrical discharges, the other input of the measuring circuit 9 being connected to the other terminal of the pulse generator 3. The average triggering delay measuring circuit 9, which may take the form of, for example, the circuit described in U.S. Pat. No. 3,825,714, provides at its output a signal representative of the average value of the time interval between the instant at which a voltage pulse is applied across the electrodes and the instant at which a current pulse corresponding to an effective electrical discharge starts to flow across the electrodes.

The electrode tool 2 is displaced by a servo motor 10 which is controlled by the servo control 11 having three inputs. One of the inputs of the servo control 11 is connected by a line $S_1$ to the control circuit 8, another input is connected to the electrode tool 2 and the third input is connected to the output of a comparator 12. The two inputs of the comparator 12 are connected respectively to a detector 13 of the axial position of the electrode tool 2 and to a component 14 providing a reference for the axial position of the electrode tool. The elements referred to by reference numerals 11 through 14 are adapted to displace the electrode tool 2 such as to maintain predetermined machining conditions in the machining zone without displacing the electrode tool 2 beyond a limit position set by the electrode tool reference element 14. Such circuits are well known and they are described in detail in U.S. Pat. No. 4,049,942.

The system of the invention further comprises a counter 15, an input of which is connected to the output of the electrode tool position detector or transducer 13 and to the control circuit 8 through a line $S_2$. The control circuit 8 is also connected to two shift registers 16 and 17 via lines $S_3$ and $S_4$, respectively, and to the pulse generator 3 via a line $S_5$. The shift registers 16 and 17 have each a second input connected respectively to the output of the delay measuring circuit 9 and to the output of the counter 15. The information stored in the shift registers 16 and 17 together with the instantaneous value of the average triggering delay of the electrical discharges as supplied by the measuring circuit 9 are fed into a calculator 18, whose output is applied to one of the inputs of a comparator 19, a gap reference value supplied by an element 20 being applied to the other input of the comparator 19. The output of the comparator 19 is connected to an input of the pulse generator 3.

The above described system functions as follows:

The final machining dimension of the workpiece 1 is determined by both the final position of the electrode tool 2 as set by the reference value given by the reference value element 14 and by the final gap as determined by the gap reference element 20. When the reference position of the electrode tool 2 is reached, the control circuit 8 starts its operation for triggering a sequence of measures of the gap width and of the average delay of the electrical discharges.

A signal is supplied by the control circuit 8 to the shift register 16 through the line $S_3$ for storing the instantaneous value of the average triggering delay of the electrical discharges as measured by the delay measuring circuit 9. Simultaneously therewith, the counter 15 is turned back to zero by means of a signal supplied by the control circuit 8 through the line $S_2$.

Subsequently, the control circuit 8 provides a command signal, through the line $S_5$, to the pulse generator 3 to supply voltage pulses incapable of producing electrical discharges, for example by increasing the impedance of the circuit supplying the voltage pulses across the electrodes. Another command signal through the line $S_2$ starts the counter 15 simultaneously with a command signal through the line $S_1$ to the servo control 11 for advancing the electrode tool 2 until it engages the workpiece 1. The instant at which engagement of the electrodes is effected is detected by the current measuring component 7 which supplies a signal to the control circuit 8 for stopping the counter 15. The number counted by the counter 15 has been stored in the shift register 17 and the time taken for engaging the electrodes with each other is proportional to the number counted by the counter 15 and stored in the shift register 17, thus proportional to the gap width.

The electrode tool 2 is subsequently retracted to a normal gap. The control circuit 8 commands the pulse generator 3 to re-establish normal voltage pulses across the machining zone, providing normal electrical discharges and, due to the fact that the electrode tool has reached its final position and further advance of the electrode tool is prevented by the action of the comparator 12, the width of the gap increases. After a short period of further machining, the control circuit 8 instigates a new sequence of measures of the average pulse triggering delay and of the gap width, whose instantaneous values are respectively stored in the shift registers 16 and 17. The four values thus stored are utilized by the calculation unit 18 to determine the instantaneous value of the gap according to the predetermined empirical function, as hereinbefore mentioned.

When the instantaneous value representing the gap width reaches the value determined by the reference circuit 20, a signal is supplied from the comparator 19 to the pulse generator 3 to stop machining by shutting off the pulse generator. The final machining dimension is thus obtained with a very high accuracy.

It will be appreciated that measures of the machining gap width and of the average triggering delay can be effected by the invention at any time during machining, for example during penetration of the electrode tool into the workpiece.

Having thus described the present invention by way of a practical example of apparatus for practicing the method of the invention, modifications whereof will be apparent to those skilled in the art, what is claimed as new is as follows:

1. A method for machining by electrical discharges an electrode workpiece by means of an electrode tool, wherein a machining fluid having in suspension electrically conductive particles is introduced in a machining gap between said electrodes and consecutive voltage pulses are applied across said electrodes for triggering electrical discharges, the improvement comprising measuring the width of the machining gap and measuring the electrical discharge triggering delay for at least two different values of said gap width while maintaining constant the concentration of said particles in suspension in said fluid during said measurements, applying said measurements as parameters for developing an empirical function between the gap width and the average electrical discharge triggering delay, and determining from said function the instantaneous value of a gap width from an instantaneous measurement of an average triggering delay.

2. The improvement of claim 1 wherein said electrodes are prevented from advancing towards each other beyond a predetermined relative position while maintaining said electrical discharges, and wherein said measurements of said gap width and of said average triggering delay are effected from the instant when said relative position is reached, and wherein machining is stopped as soon as the calculated value of the machining gap width reaches a reference value.

3. An apparatus for machining by electrical discharges an electrode workpiece by means of an electrode tool, wherein a machining fluid having electrically conductive particles in suspension therein is introduced in a machining gap between said electrodes and consecutive voltage pulses are applied across the electrodes for triggering said electrical discharges, said apparatus comprising a voltage pulse generator connected across the electrodes, a servo motor for displacing one electrode relative to the other in response to machining conditions, first means associated with said pulse generator for effecting at least two measurements of the average value of electrical discharge triggering delay while maintaining the concentration of particles in suspension in said machining fluid at a constant value, second means associated with said servo motor for effecting at least two measurements of the corresponding width of the gap between said electrodes, and means co-operating with said first and second means for calculating the instantaneous value of the average triggering delay according to a predetermined linear function between the inverse of the gap and the logarithm of the average triggering delay.

4. The apparatus of claim 3 wherein a comparator provides a signal as soon as a measured value of said gap width reaches a reference value, and further comprising means associated with the pulse generator for stopping machining in response to said signal.

* * * * *